(12) United States Patent
Wu et al.

(10) Patent No.: US 7,434,236 B2
(45) Date of Patent: Oct. 7, 2008

(54) TRAY-TYPE OPTICAL DISC DRIVE WITH IMPROVED RELIABILITY UNDER VERTICAL DISPOSITION

(75) Inventors: Jen-Chen Wu, Yunlin (TW); Wen-Kuan Peng, Taoyuan (TW)

(73) Assignee: Quanta Storage Inc. (TW)

( * ) Notice: Subject to any disclaimer, the term of this patent is extended or adjusted under 35 U.S.C. 154(b) by 540 days.

(21) Appl. No.: 11/153,611

(22) Filed: Jun. 16, 2005

(65) Prior Publication Data

US 2006/0288355 A1 Dec. 21, 2006

(51) Int. Cl.
*G11B 17/04* (2006.01)

(52) U.S. Cl. .................................. 720/603; 720/604

(58) Field of Classification Search ............... 720/603, 720/604, 610, 611
See application file for complete search history.

(56) References Cited

U.S. PATENT DOCUMENTS

| 5,793,729 | A | * | 8/1998 | Soga et al. | 720/603 |
|---|---|---|---|---|---|
| 5,930,218 | A | * | 7/1999 | Mitsui et al. | 720/613 |
| 6,122,240 | A | * | 9/2000 | Kim | 720/603 |
| 6,295,265 | B1 | * | 9/2001 | Cundiff, Sr. | 720/603 |
| 6,370,101 | B1 | * | 4/2002 | Kim | 720/603 |
| 6,392,976 | B1 | * | 5/2002 | Lin | 720/611 |
| 6,618,340 | B1 | * | 9/2003 | Sawada | 720/603 |
| 6,817,021 | B1 | * | 11/2004 | Miyasaka et al. | 720/603 |
| 6,961,947 | B2 | * | 11/2005 | Chuang et al. | 720/611 |
| 2003/0133390 | A1 | * | 7/2003 | Chuang et al. | 369/75.2 |
| 2004/0081056 | A1 | * | 4/2004 | Huang et al. | 369/75.2 |
| 2005/0015784 | A1 | * | 1/2005 | Han | 720/604 |
| 2006/0005213 | A1 | * | 1/2006 | Ohgaki | 720/603 |
| 2006/0136940 | A1 | * | 6/2006 | Nishide et al. | 720/603 |

* cited by examiner

*Primary Examiner*—Brian E Miller
(74) *Attorney, Agent, or Firm*—Birch, Stewart, Kolasch & Birch, LLP

(57) ABSTRACT

A tray-type optical disc drive includes a base unit, an optical disc drive body, a front panel and a disc tray. The disc tray includes at least a retainer and a receiver. The receiver includes a horizontal bearing area, a ramp and a vertical bearing area. The ramp outwardly adjoins the horizontal bearing area while the vertical bearing area outwardly adjoins the ramp. The horizontal bearing area contacts with the outer edge of the disc when the disc is under horizontal disposition. The retainers are disposed on the receiver. When the disc is under vertical disposition, the retainers stop the disc edge for the disc to be positioned. The vertical bearing area and the retainer stop the lower edge of the disc edge. The upper edge of the disc edge leans against the horizontal bearing area.

18 Claims, 7 Drawing Sheets

TRAY-TYPE OPTICAL DISC DRIVE WITH IMPROVED RELIABILITY UNDER VERTICAL DISPOSITION

This application incorporates by reference Taiwanese application Serial No. 93109390, filed Apr. 5, 2004.

BACKGROUND OF THE INVENTION

1. Field of the Invention

The invention relates in general to a tray-type optical disc drive, and more particularly to a tray-type optical disc drive improving the reliability of the disc under vertical disposition.

2. Description of the Related Art

Due to the rapid growth in the volume of information, most of the multi-media products are issued in the form of optical discs. While consumptive optical discs are widely used nowadays, the optical disc drive has become an indispensable piece of equipment to a computer. Normally, the most commonly seen tray-type optical disc drive is installed in an ordinary computer with the surface of the disc lying horizontally. Such tray-type optical disc drive is called horizontal type optical disc drive, and can be applied in a vertical mainframe of desk top computer or an external optical disc drive. Similarly, an optical disc drive is called a vertical type optical disc drive if the surface of the disc is vertical when the disc is loaded in a computer, and can be applied in a vertical mainframe of a desk top computer or an external optical disc drive to achieve a better utilization of the space.

Conventional tray-type optical disc drive uses a moveable retainer to stabilize a disc under vertical disposition. Referring to FIG. 1, a diagram of a conventional tray-type optical disc drive is shown. Conventional tray-type optical disc drive 100 includes an optical disc drive body 110, a disc tray 120, an upper cover 130, a front panel 150 and a base unit 160. The upper cover 130 is for covering the optical disc drive body 110. The front panel 150 is disposed in the front side of the optical disc drive body 110. The disc tray 120 is disposed on the optical disc drive body 110 and moves along direction A of FIG. 1 to carry the disc to enter the optical disc drive body 110 from outside. The disc tray 120 has a receiver 122 disposed thereon for receiving the disc.

When the tray-type optical disc drive 100 is under vertical disposition, the disc tray 120 needs to have special mechanism of design to hold the disc until the correct feeding position is reached, so that errors in data retrieving can be avoided and that the disc would not come off the disc tray 120 when the disc tray is entering or leaving the disc drive. For example, four moveable retainers 140 are evenly disposed on an inner surface of the receiver 122. When tray-type optical disc drive is vertically disposed, the user loads the disc into the receiver 122 first, then touches the moveable retainer 140 with fingers for the disc to be retained at the correct feeding position on the receiver 122, so that the disc would not come off the disc tray 120 when the disc tray 120 is entering or leaving the disc drive.

However, the disc tray 120 and the moveable retainer 140 disclosed above are not able to complete retain the disc. Therefore, the data surface of the disc is very likely to be scratched when the disc enters or leaves the disc drive vertically. Moreover, it is indeed inconvenient that the user has to touch the moveable retainer 140 with fingers for the disc to be fixed at the correct feeding position. Furthermore, the disposition of the moveable retainer 140 increases both material cost and assembly cost.

If the disc in use is a defective disc by any chance, the disc is likely to break into pieces when the disc loaded in the tray-type optical disc drive 100 is rotated in a high speed to be retrieved by the tray-type optical disc drive 100. The broken disc which is ejected and scattered around in a high speed is very likely to hit and deform the front panel 150. The fragments of the broken disc may even hurt the user when ejected from the tray-type optical disc drive 100 through the clearance between the front panel 150 and the disc tray 120.

SUMMARY OF THE INVENTION

It is therefore an object of the invention to provide a tray-type optical disc drive. With a modified structure of the disc tray, the reliability of the disc is improved no matter the disc is disposed horizontally or vertically. Moreover, the invention prevents the front panel from coming off the disc drive when hit by a large fragment of the broken disc, further assuring the safety of the user.

According to the object of the invention, a tray-type optical disc drive including a base unit, an optical disc drive body, a front panel and a disc tray is provided. The optical disc drive body is disposed inside the base unit. The front panel is disposed in the front side of the optical disc drive body. The disc tray is disposed on the optical disc drive body and can enter and leave the optical disc drive body. The disc tray includes at least a retainer and a receiver for receiving a disc. The receiver includes a horizontal bearing area, a ramp and a vertical bearing area. The ramp outwardly adjoins the horizontal bearing area while the vertical bearing area outwardly adjoins the ramp. When the disc is under horizontal disposition, the outer edge of the disc comes into contact with the horizontal bearing area. The retainers are disposed on the receiver. When the disc is under vertical disposition, the retainers stop the disc edge for the disc to be positioned. The vertical bearing area and the retainer together stop the lower edge of the disc edge. The upper edge of the disc edge leans against the horizontal bearing area. Moreover, the optical disc drive body further has a spindle motor turntable disposed in the center of the receiver. The protrusion is disposed inside an axis passing through the center of the receiver. When the disc tray enters the optical disc drive body and the disc edge comes into contact with the protrusion, the disc is pushed by the protrusion and starts to move upwardly.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
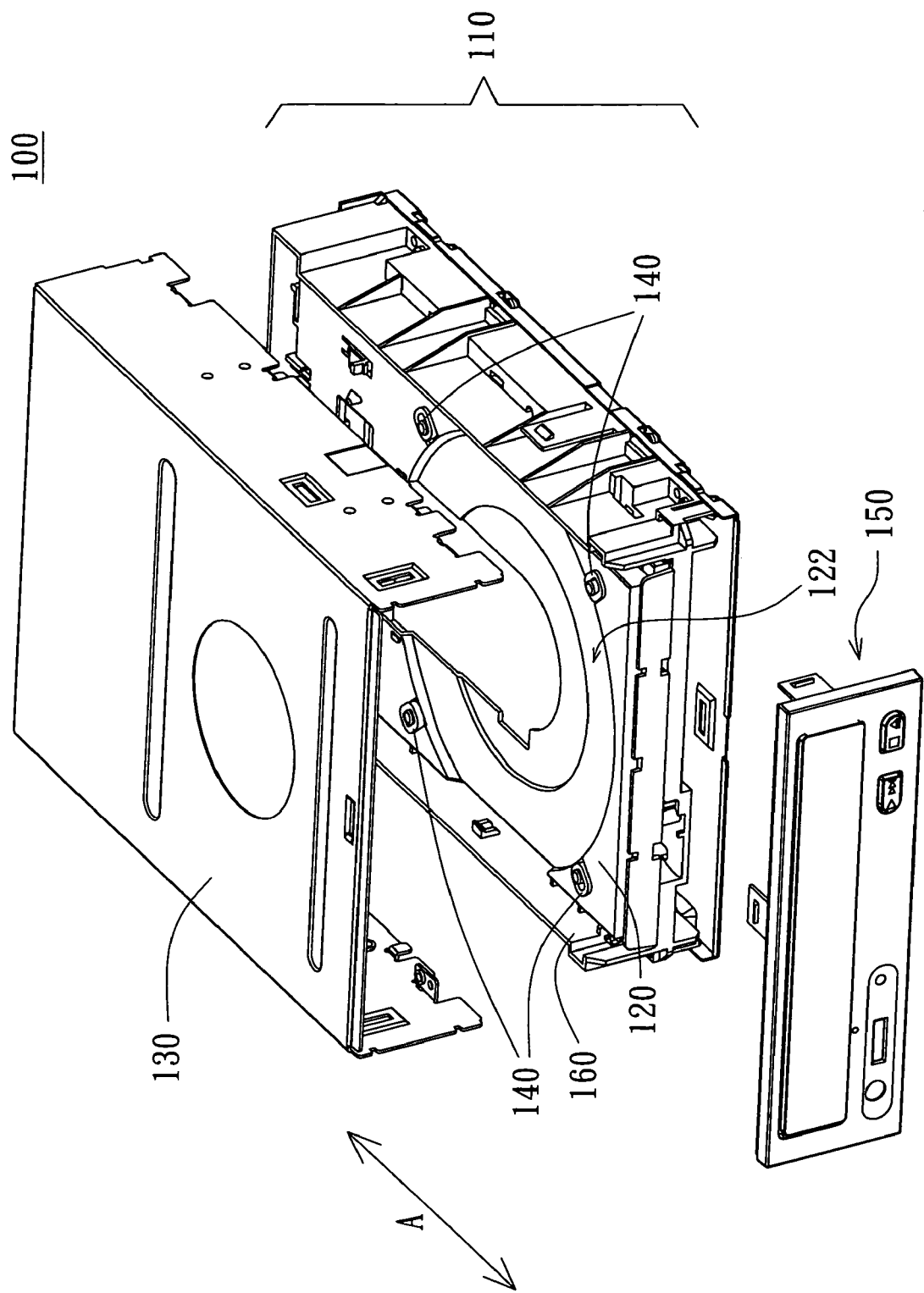
FIG. 1 (Prior Art) is a diagram of a conventional tray-type optical disc drive.
Figure 2:
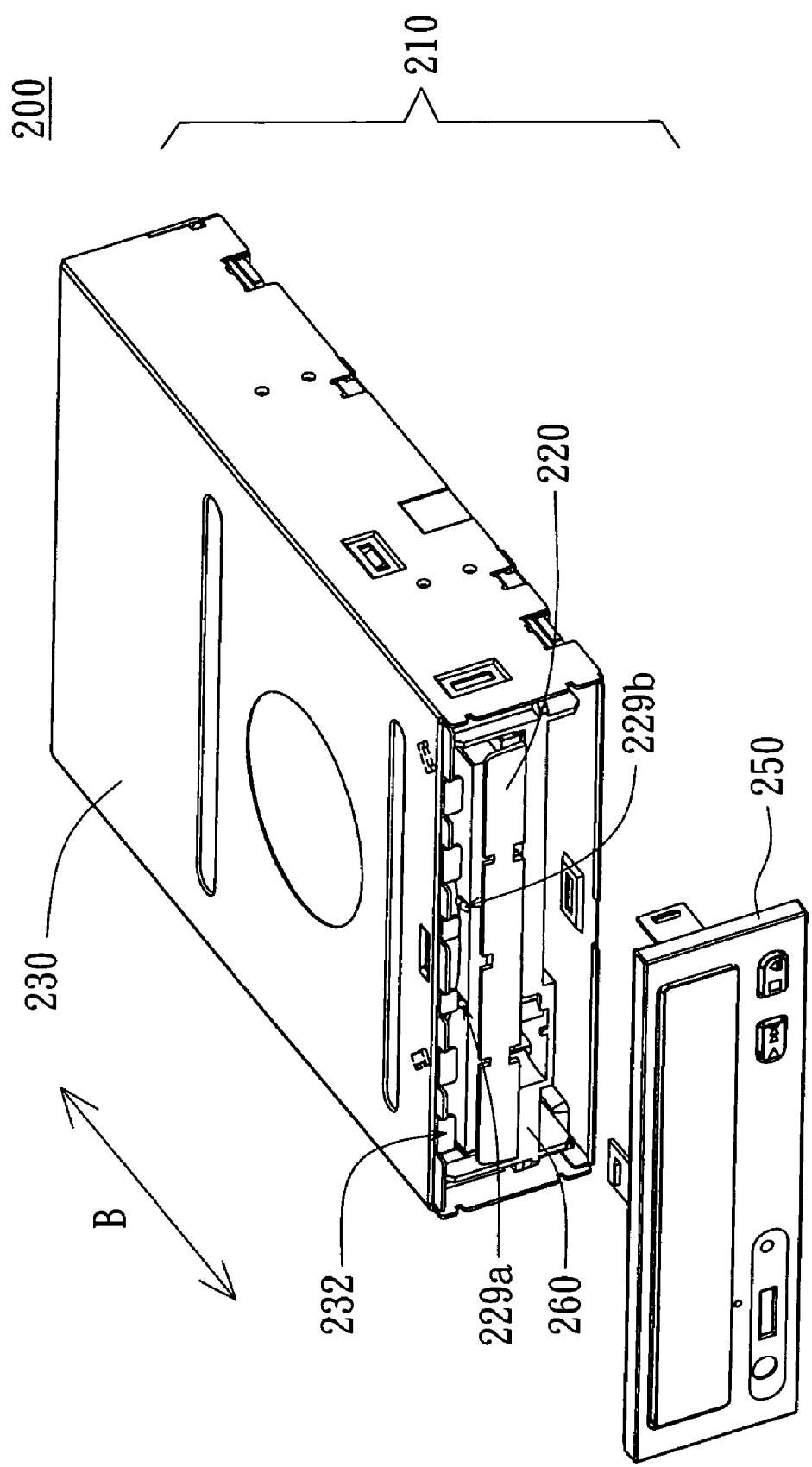
FIG. 2 is a diagram of a tray-type optical disc drive according to a preferred embodiment of the invention.

Referring to FIG. 2, a diagram of a tray-type optical disc drive according to a preferred embodiment of the invention is shown. The tray-type optical disc drive 200 includes an optical disc drive body 210, a disc tray 220, an upper cover 230, a front panel 250 and a base unit 260. The upper cover 230 is for covering the optical disc drive body 210. The front panel 250 is disposed in the front side of the optical disc drive body 210. The disc tray 220 is disposed on the optical disc drive body 210 and moves along direction B in FIG. 2 to carry the disc to enter the optical disc drive body 210 from outside.

Figure 3A:
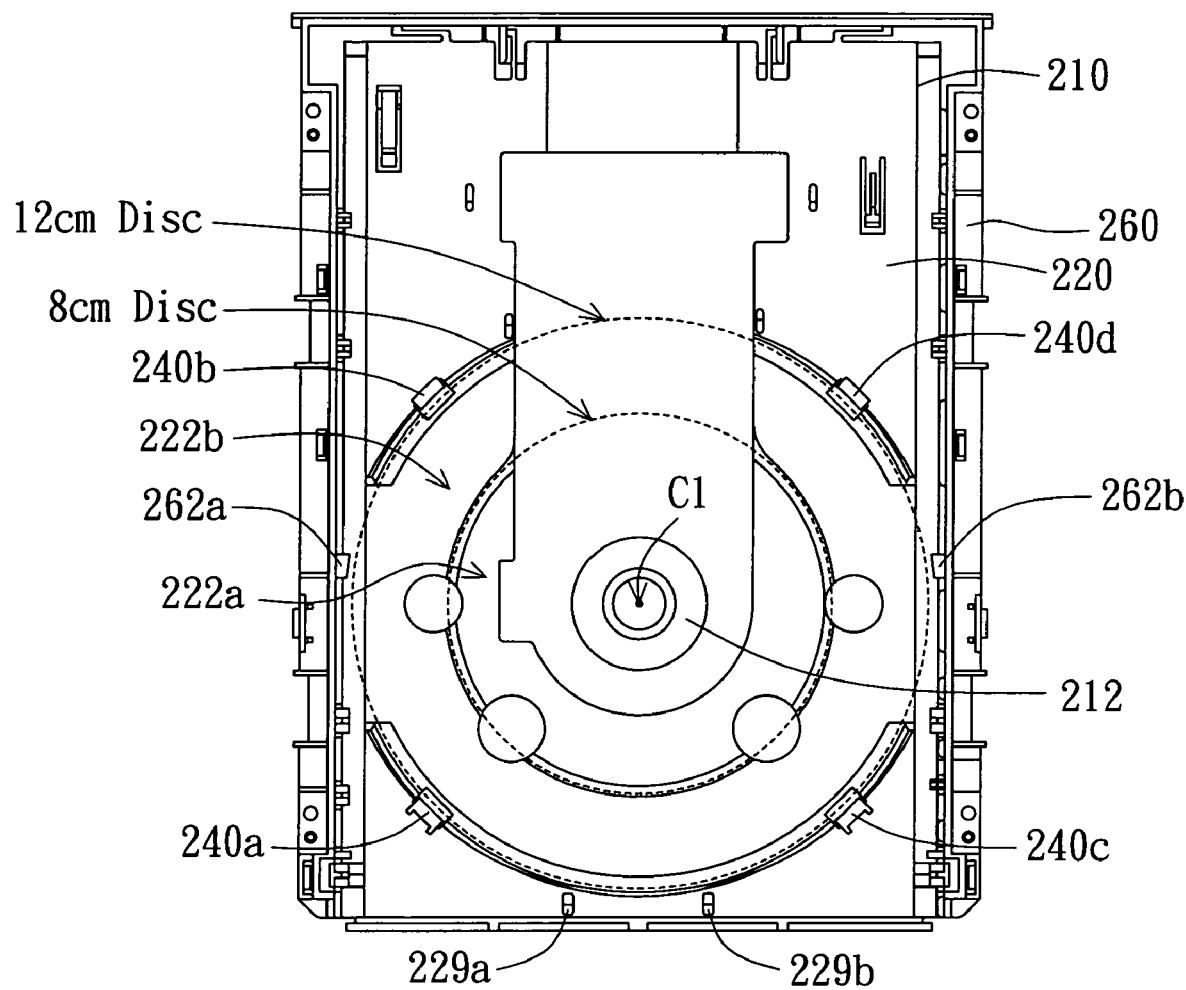
FIG. 3A is a diagram of a disc tray, an optical disc drive body and a base unit.

Referring to FIG. 3A, a diagram of a disc tray 220, an optical disc drive body 210 and a base unit 260 is shown. The optical disc drive body 210 is disposed inside the base unit 260. In FIG. 3A, the disc tray 220 has been moved to be inside the optical disc drive body 210. The two lateral sides of the base unit 260 have two protrusions 262a and 262b respectively. The disc tray 220 has two concentric receivers 222a and 222b for receiving 8 cm and 12 cm disc respectively. The center of the receivers 222a and 222b is at the same time the center C1 of the spindle motor turntable 212. Preferably, four retainers 240a, 240b, 240c and 240d having the equal distance from the center C1 are evenly disposed on the 12 cm receiver of 222b.

Figure 3B:
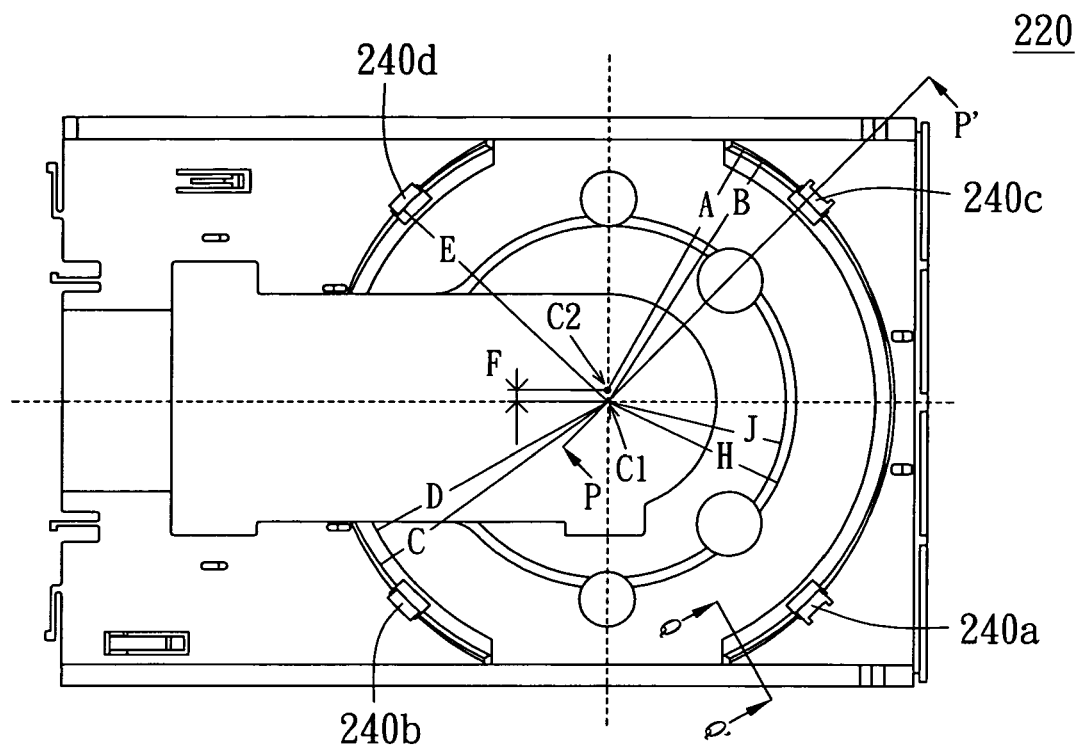
FIG. 3B is a diagram of a disc tray.
Figure 3C:
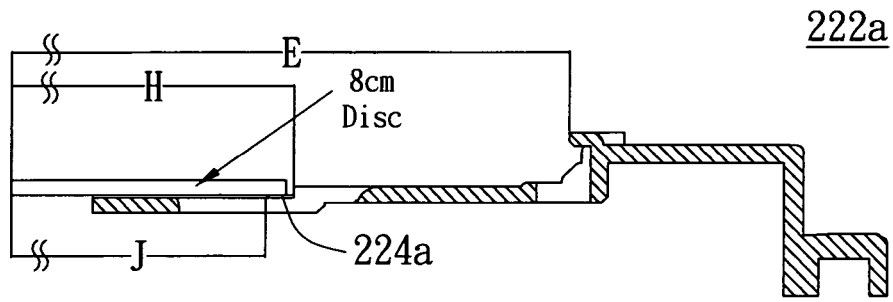
FIG. 3C is a cross-sectional diagram taken along the sectional line P-P' in FIG. 3B.
Figure 3D:
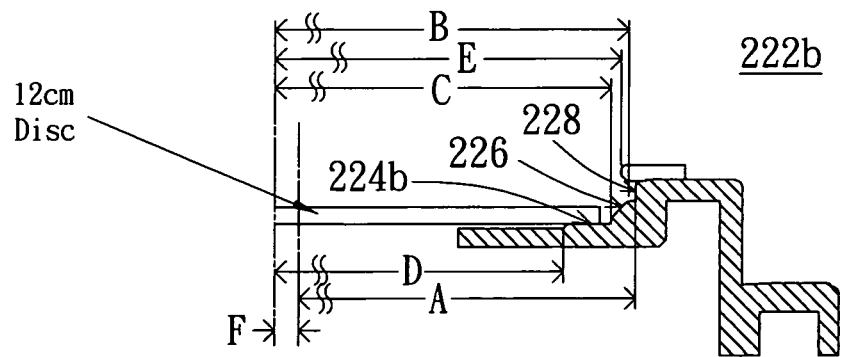
FIG. 3D is a cross-sectional diagram taken along the sectional line Q-Q' in FIG. 3B.

Refer to FIG. 3B, FIG. 3C and FIG. 3D at the same time. FIG. 3B is a diagram of the disc tray 220, FIG. 3C is a cross-sectional diagram taken along the sectional line P-P' in FIG. 3B, and FIG. 3D is a cross-sectional diagram taken along the sectional line Q-Q' in FIG. 3B. The outer edges of the receivers 222a and 222b for receiving an 8 cm disc and a 12 cm disc respectively has a horizontal bearing area 224a and a horizontal bearing area 224b disposed thereon. The outer side of the horizontal bearing area 224b of the receiver 222b is further connected to a ramp 226 and a vertical bearing area 228.

In terms of the 8 cm disc, when the 8 cm disc horizontal disposition is received in the receiver 222a, the outer edge of the 8 cm disc only comes into contact with the horizontal bearing area 224a. In terms of the 12 cm disc, when the 12 cm disc horizontal disposition is received in the receiver 222b, the outer edge of the 12 cm disc only comes into contact with the horizontal bearing area 224b. Therefore, the data surface of the disc will not be scratched.

In the diagram, the measure of B equals the distance between the ramp 226 and the center C1 of spindle motor turntable 212. The measure of C equals the distance between the horizontal bearing area 224b and the center C1 of the spindle motor turntable. The measure of D equals the distance between the bottom of the horizontal bearing area 224b and the center C1 of the spindle motor turntable. The measure of E equals the distance between either of the retainers 240a, 240b, 240c and 240d and the center C1 of the spindle motor turntable 212. The measure of C is approximately equal to the radius of the 12 cm disc. When the 12 cm disc is to be horizontally disposed, the measure of C is used for the 12 cm disc to be positioned and an inappropriately placed disc is aligned with the assistance of the ramp 226, so that the central hole of the disc is aligned with the center C1 of the spindle motor turntable 212 after the disc enters the optical disc drive body 210. Therefore, the design of the measure of B, C, D and E is relevant to the disc under horizontal disposition, while that of A is relevant to the disc under vertical disposition. It can be seen from FIG. 3B that the corresponding arcs of the measures B, C, D and E correspond to the same center C1 of the spindle motor turntable 212. However, the circular center of the corresponding arc of the measure A is C2. C2 is a position obtained by shifting the center C1 of the spindle motor turntable 212 to a distance F.

Figure 4:
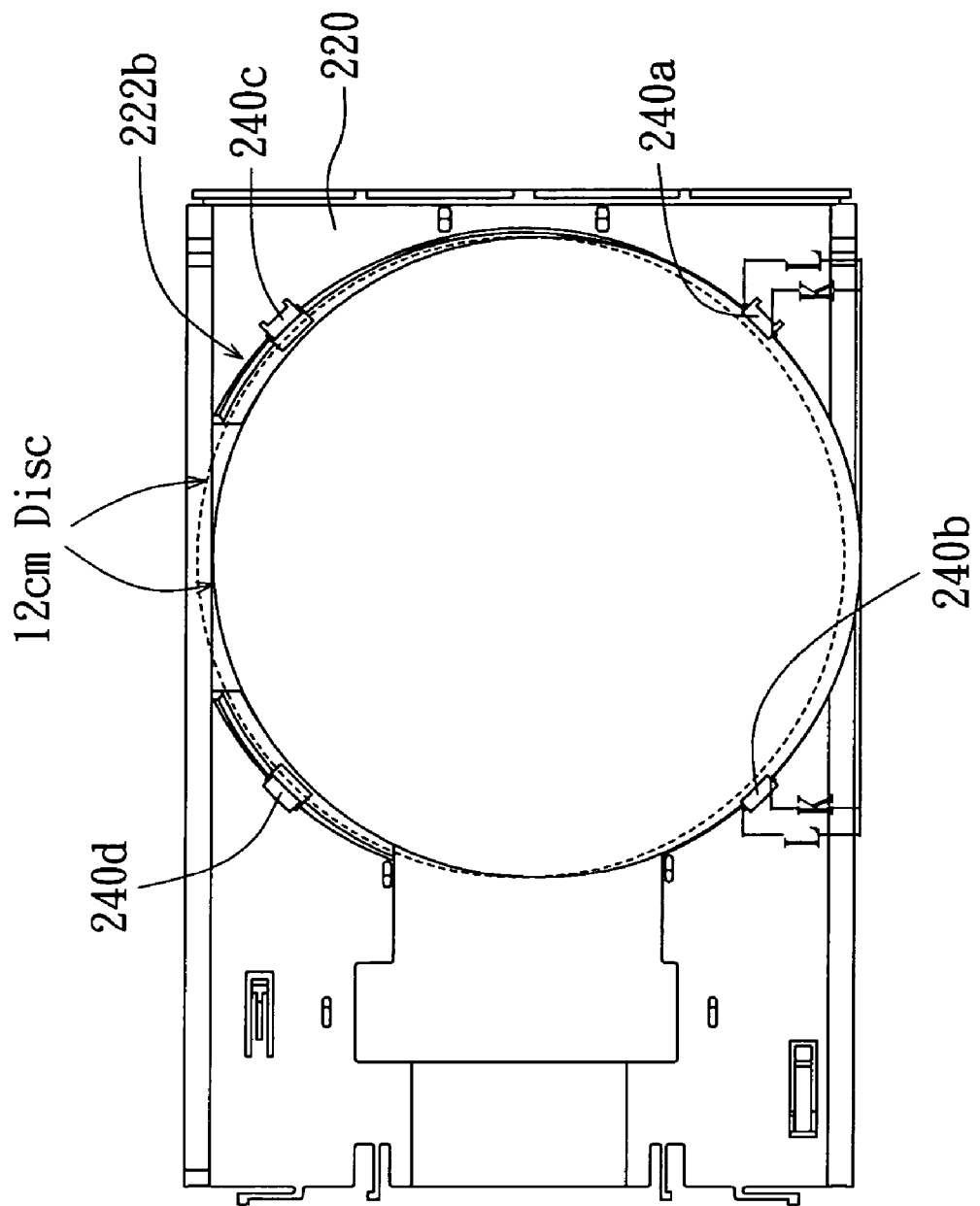
FIG. 4 is a diagram of a disc under horizontal or vertical disposition when the disc tray is outside the disc drive.

Due to the gravity, when the tray-type optical disc drive 200 is disposed vertically, the disc would sink downwardly and the relative position between the receiver 222b and the 12 cm disc carried thereby would change. Consequently, the position of the 12 cm disc under vertical disposition would be lower than that under horizontal disposition. Referring to FIG. 4, a diagram of a disc under horizontal or vertical disposition when the disc tray is outside the disc drive is shown. According to the diagram, the dotted line represents the position of the 12 cm disc when horizontally disposed in the receiver 222b, and the solid line represents the position the position of the 12 cm disc when vertically disposed in the receiver 222b.

On the other hand, the retainers 240a and 240b disposed on the receiver 222b are used to stop the disc edge for the disc to be positioned. However, the position of the retainers 240a and 240b must be subject to a certain restrictions to assure that the retainers 240a and 240b can function effectively. If the retainers 240a and 240b are disposed too far away from the lowest point of the disc, the retainers 240a and 240b would not be able to stop the disc edge. If the retainers 240a and 240b are disposed too close to the lowest point of the disc, the disc would easily tilt to one side and drop from the receiver 222b. That is to say, the retainers 240a and 240b must be disposed in the manner that the vertical distance between the retainers 240a and 240b and the lowest point of the disc is smaller than an upper limit L and the a lower limit K. The upper limit L assures that the retainer can stop the disc edge; and the lower limit prevents the disc from dropping from the receiver easily. Preferably, the upper limit L and the lower limit K are equal to 30 mm and 15 mm respectively. The range of 15 mm to 30 mm is exactly ¼ of the radius of the disc to ½ of the radius of the disc.

Figure 5:
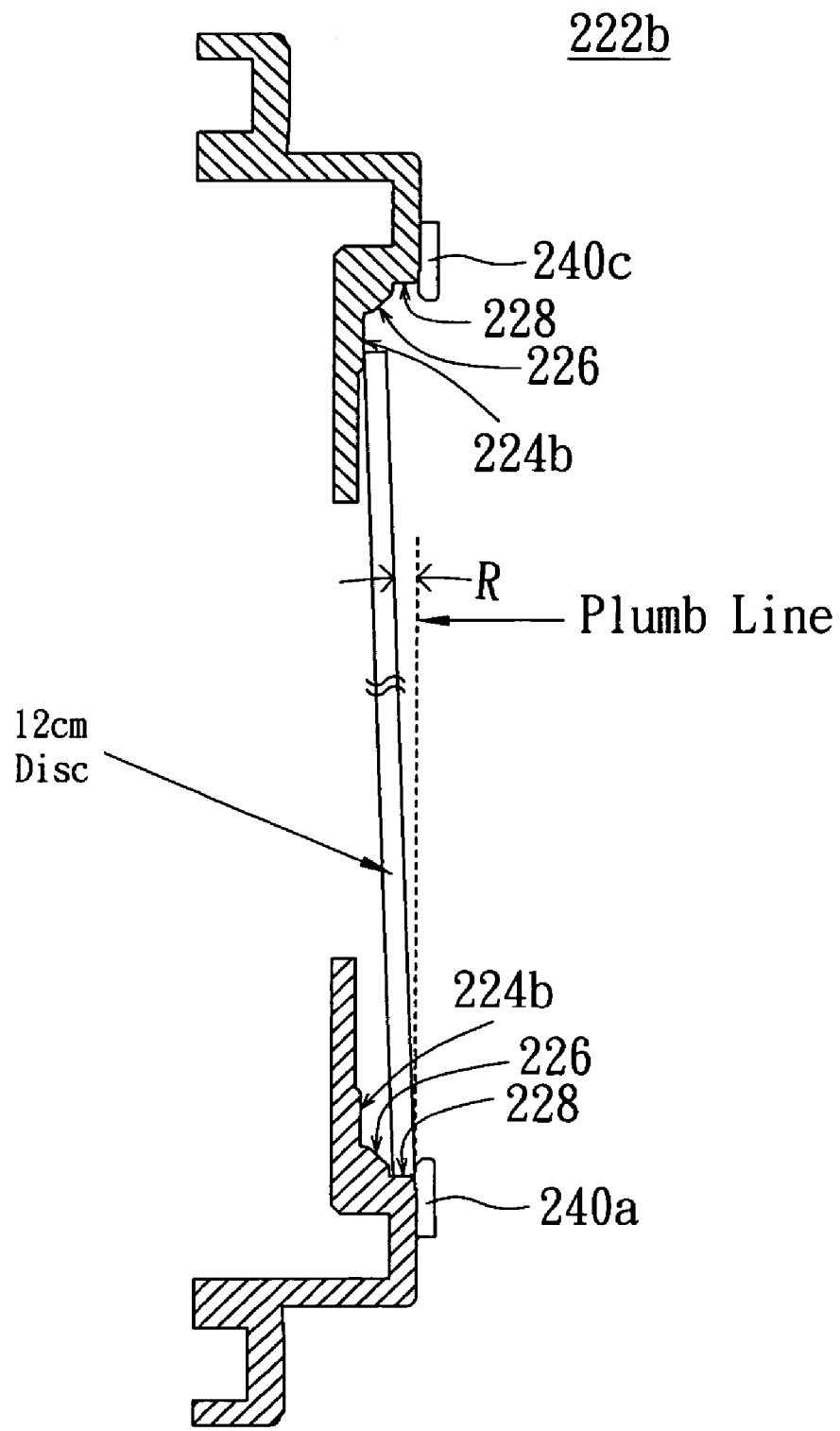
FIG. 5 is a diagram of the disc under vertical disposition.

Next, referring to FIG. 5, a diagram of the disc under vertical disposition is shown. When the 12 cm disc is under vertical disposition, a small angle R is formed between the disc and the plumb line. R is larger than 0°. The vertical bearing area 228 of the receiver 222b and the retainer 240a together stop the lower edge of the disc edge, while the upper edge of the disc edge leans against the horizontal bearing area 224b of the receiver 222b. Therefore, the reliability of the disc when leaving and entering the disc drive can be assured. Moreover, it is the outer edges of the disc that come into contact with the disc tray, the data surface of the disc would not be scratched easily.

Figure 6:
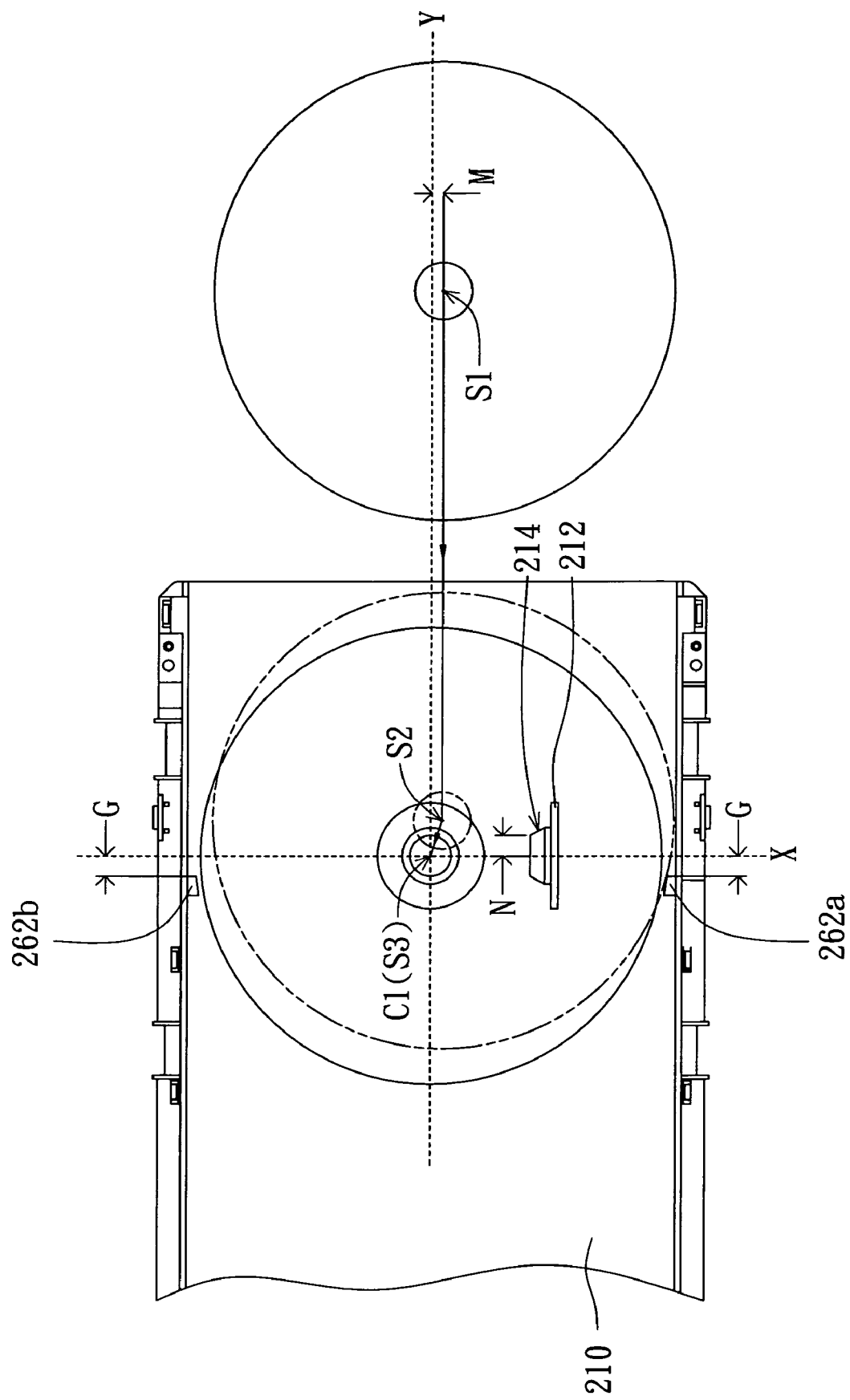
FIG. 6 shows a trace of the disc entering the optical disc drive body from outside.

Next, referring to FIG. 6, a trace diagram of the disc entering the optical disc drive body 210 from outside is shown. From right to left in the diagram shows the traces and movements of the disc under vertical disposition entering the disc drive from outside. Both the X-axis and the Y-axis pass through the center C1 of the spindle motor turntable 212. The X-axis is perpendicular to the Y-axis. When the 12 cm disc is vertically disposed inside the receiver of 222b of the disc tray 220, the center of the disc is positioned under the Y-axis and is denoted by a first position S1. The distance between the first position S1 and the Y-axis is M. When the disc tray 220 carries the disc to gradually enter the optical disc drive body 210 from outside, the center of the disc shifts to a second position S2 positioned inside the optical disc drive body 210 from the first position S1. Then the center of the disc shifts to a third position S3 from the second position S2 and stops. The third position S3 is exactly the center C1 of the spindle motor turntable 212.

When the disc enters into the optical disc drive body 210 and the disc edge comes into contact with the protrusion 262a disposed on a lateral side of the base unit 260, that is when the center of the disc reaches the second position S2, the protrusion 262a pushes the disc to move upwards until the center of the disc adjoins the center C1 of the spindle motor turntable 212 at the third position S3.

The protrusion 262a is preferably disposed to the left of the X-axis and is a distance G away from the X-axis to assure the protrusion 262a can function effectively. The distance G is preferably approximate the radius of the top surface of the protrusion 214 disposed on the spindle motor turntable 212. If the protrusion 262a is disposed to the right of the X-axis, the second position S2 is relatively to the right of the third position S3, causing the disc to move upwards earlier. When the center of the disc moves upwards earlier, the raised disc would be easily detached from the retainers 240a and 240b, increasing the risk of causing the disc to tilt and drop from the receiver 222b.

The embodiment is exemplified by a vertically disposed tray 220 with the protrusion 262a being disposed at the bottom of the disc tray and the protrusion 262b being positioned at the top of the disc tray. When the disc tray 220 is vertically disposed with the protrusion 262a being disposed at the top of the disc tray and the protrusion 262b being disposed at the bottom of the disc tray, the protrusion 262b disposed on another lateral side of the base unit 260 is used to push the disc.

Moreover, as the read/write speed of the optical disc drive increases, rotation rate of the disc also increases to be over 10,000 rpm, generating a strong air current in the vicinity of the disc. The air current would easily cause the disc to wobble. Besides, the centrifugal moment of the disc is proportional to the square of the rotation rate. Therefore, the disc rotated in a high speed inside the optical disc drive is under severe influence of the air current and the centrifugal moment. The disc rotated in a high speed inside the optical disc drive is likely to be damaged and broken into pieces if the disc in use is of poor quality. The larger the fragment is, the larger the impact of collision is resulted.

Referring to FIG. 2, the optical disc drive body 210 is mainly enclosed by the upper cover 230. The upper cover 230 is a plate made of galvanized steel and is capable of absorbing a heavy impact of collision. The front panel 250 is formed by plastic ejection molding and is incapable of absorbing a heavy impact of collision. In order to overcome the above weaknesses, the embodiment further disposes a plurality of bending portions 232 at the front of the upper cover 230, that is, between the optical disc drive body 210 and the front panel 250. The bending portions 232 are formed by deflecting part of the upper covers 230. The bending portion 232 and the upper cover 230 are monolithically formed. Without incurring any additional material cost and assembly cost, larger fragments of a broken disc inside the tray-type optical disc drive 200 would hit the bending portions 232 first instead of hitting the front panel 250 directly. Only smaller fragments would hit front panel 250 directly, so the front panel 250 would only receive relatively smaller impact and would not be damaged and detached. Therefore, the user's safety is further improved.

Alternatively, refer to FIG. 2 and FIG. 3A. By disposing a plurality of projection parts 229a and 229b at the front of the disc tray 220 and fortifying the strength of the disc tray retainers 240a and 240c, larger fragments of a broken disc thrust at a high speed are contained inside the tray-type optical disc drive 200 and would not hit the front panel 250 directly.

The tray-type optical disc drive disclosed in above embodiments of the invention has a modified mechanism of the disc tray capable of increasing the reliability no matter the disc is disposed horizontally or vertically. When the disc under is under vertical disposition, a small angle is formed between the disc and the plumb line to assure the reliability of the disc when entering or leaving the disc drive. It is very easy to horizontally or vertically dispose the disc without scratching the data surface of the disc. Moreover, without increasing material cost or assembly cost, the invention enhances the strength of the disc tray retainer and a plurality of projection parts, preventing the front panel from being hit a large piece of a broken disc. Thus the user's security is further assured.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A disc tray applied in a tray-type optical disc drive including an optical disc drive body and a base unit, wherein the optical disc drive body is disposed inside the base unit, and the disc tray disposed on the optical disc drive body is movable in and out of the optical disc drive body and comprises:
   a receiver for receiving a disc, wherein the receiver comprises:
      a horizontal bearing area, wherein an outer edge of the disc comes into contact with the horizontal bearing area when the disc is under horizontal disposition;
      a ramp outwardly adjoining the horizontal bearing area; and
      a vertical bearing area outwardly adjoining the ramp; and
   at least one retainer disposed on the receiver, wherein the retainer stops a disc edge to position the disc when the disc is under vertical disposition;
   wherein the base unit includes a protrusion disposed on a lateral side thereof and inside an axis passing through the center of the disc, when the disc edge comes into contact with the protrusion, the disc is pushed by the protrusion and starts to move upwardly.

2. The disc tray according to claim 1, wherein the vertical distance between the retainer and a lowest point of the disc under vertical disposition is approximately equal to 15 mm~30 mm.

3. The disc tray according to claim 1, wherein an angle R larger than 0° is formed between the disc and a plumb line when the disc is under vertical disposition.

4. The disc tray according to claim 1, wherein the vertical bearing area and the retainer stop a lower edge of the disc edge while an upper edge of the disc edge leans against the horizontal bearing area when the disc is under vertical disposition.

5. The disc tray according to claim 1, wherein the tray-type optical disc drive further has a front panel disposed in a front side of the optical disc drive body, and the optical disc drive body has a spindle motor turntable disposed in the center of the disc.

6. The disc tray according to claim 1, wherein the tray-type optical disc drive further comprises an upper cover and a front panel, the upper cover has a plurality of bending portions positioned between the optical disc drive body and the front panel when the disc tray enters the optical disc drive body.

7. The disc tray according to claim 6, wherein the bending portions are formed by bending part of the upper cover directly, the bending portions and the upper cover are monolithically formed.

8. The disc tray according to claim 1 further comprising a plurality of projection parts disposed in a front end of the disc tray, wherein the tray-type optical disc drive further has a front panel disposed in a front side of the optical disc drive body, the projection parts are disposed between the receiver and the front panel.

9. A disc tray-type optical disc drive having an optical disc drive body, a base unit and a disc tray, wherein the optical disc drive body is disposed inside the base unit, the base unit includes a protrusion disposed on a lateral side thereof and inside an axis passing through the center of the disc on the disc tray, and the disc tray disposed on the optical disc drive body is movable in and out of the optical disc drive body and comprises:
 a receiver for receiving the disc, wherein the receiver comprises:
  a horizontal bearing area, wherein an outer edge of the disc comes into contact with the horizontal bearing area when the disc is under horizontal disposition;
  a ramp outwardly adjoining the horizontal bearing area;
  a vertical bearing area outwardly adjoining the ramp; and
 a plurality of retainers disposed on the receiver, wherein when the disc is under vertical disposition, the retainers stop a disc edge to position the disc, and the vertical bearing area and the retainers stop a lower edge of the disc edge while an upper edge of the disc edge leans against the horizontal bearing area;
 wherein when the disc edge comes into contact with the protrusion, the disc is pushed by the protrusion and starts to move upwardly.

10. The tray-type optical disc drive according to claim 9, wherein the vertical distance between the retainers and a lowest point of the disc under vertical disposition is approximately equal to 15 mm~30 mm.

11. The tray-type optical disc drive according to claim 9, wherein an angle R larger than 0° is formed between the disc and a plumb line when the disc is under vertical disposition.

12. The tray-type optical disc drive according to claim 9 further comprising a front panel disposed at a front side of the optical disc drive body, and the optical disc drive body has a spindle motor turntable disposed in the center of the disc.

13. The tray-type optical disc drive according to claim 9 further comprising an upper cover and a front panel, wherein the upper cover has a plurality of bending portions positioned between the optical disc drive body and the front panel when the disc tray enters the optical disc drive body.

14. The tray-type optical disc drive according to claim 13, wherein the bending portions are formed by bending part of the upper cover directly, the bending portions and the upper cover are monolithically formed.

15. The tray-type optical disc drive according to claim 9, further comprising a front panel disposed in a front side of the optical disc drive body, wherein the disc tray further comprises a plurality of projection parts disposed in a front end of the disc tray, and the projection parts are disposed between the receiver and the front panel.

16. A tray-type optical disc drive, comprising:
 a base unit, one lateral side of which has a protrusion;
 an optical disc drive body disposed inside the base unit;
 a front panel disposed at an outer edge of the optical disc drive body; and
 a disc tray movable in and out of the optical disc drive body, wherein the disc tray comprises a retainer and a receiver for receiving a disc, the receiver comprises:
  a horizontal bearing area coming into contact with the outer edge of the disc when the disc is under horizontal disposition,
  a ramp outwardly adjoining the horizontal bearing area; and
  a vertical bearing area outwardly adjoining the ramp;
 wherein the retainer is disposed on the receiver, and when the disc is under vertical disposition, the retainer stop a disc edge to position the disc, the vertical bearing area and the retainer stop a lower edge of the disc edge, and an upper edge of the disc edge leans against the horizontal bearing area;
 the optical disc drive body further has a spindle motor turntable disposed in the center of the disc, the protrusion is disposed inside an axis passing through the center of the disc, and the disc is pushed by the protrusion and starts to move upwardly when the disc tray enters the optical disc drive body and the edge of the disc comes into contact with the protrusion.

17. The tray-type optical disc drive according to claim 16, wherein the vertical distance between the retainer and a lowest point of the disc under vertical disposition is approximately equal to 15 mm~30 mm.

18. The tray-type optical disc drive according to claim 16, wherein the tray-type optical disc drive further has an upper cover, the front panel is disposed in a front side of the optical disc drive body, the upper cover has a plurality of bending portions, and the bending portions are positioned between the optical disc drive body and the front panel when the disc tray enters the optical disc drive body.

* * * * *